US 9,240,881 B2

(12) United States Patent
Broustis et al.

(10) Patent No.: US 9,240,881 B2
(45) Date of Patent: Jan. 19, 2016

(54) SECURE COMMUNICATIONS FOR COMPUTING DEVICES UTILIZING PROXIMITY SERVICES

(75) Inventors: Ioannis Broustis, Millburn, NJ (US); Violeta Cakulev, Millburn, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 244 days.

(21) Appl. No.: 13/460,035

(22) Filed: Apr. 30, 2012

(65) Prior Publication Data

US 2013/0290696 A1 Oct. 31, 2013

(51) Int. Cl.
*H04L 29/06* (2006.01)
*H04L 9/08* (2006.01)
*H04W 12/04* (2009.01)
*H04W 76/02* (2009.01)

(52) U.S. Cl.
CPC ........ *H04L 9/08* (2013.01); *H04L 29/06* (2013.01); *H04W 12/04* (2013.01); *H04L 63/306* (2013.01); *H04W 76/023* (2013.01)

(58) Field of Classification Search
CPC ........... H04L 29/06; H04L 9/08; H04L 63/06; H04L 63/302
See application file for complete search history.

(56) References Cited

U.S. PATENT DOCUMENTS

| 2003/0093663 | A1* | 5/2003 | Walker ............... H04L 9/3271 713/150 |
| 2007/0014409 | A1* | 1/2007 | Batra ..................... H04B 5/02 380/270 |
| 2007/0055877 | A1* | 3/2007 | Persson ............. H04L 63/0272 713/171 |
| 2009/0220091 | A1* | 9/2009 | Howard ............. H04L 63/0428 380/277 |
| 2011/0055567 | A1* | 3/2011 | Sundaram ............ H04L 9/0825 713/169 |
| 2011/0170694 | A1* | 7/2011 | Brusilovsky ......... H04L 63/062 380/278 |
| 2012/0124373 | A1* | 5/2012 | Dangoor ............... H04L 63/062 713/168 |

(Continued)

FOREIGN PATENT DOCUMENTS

WO PCT/US2013/037108 7/2013

OTHER PUBLICATIONS

3GPP, "3rd Generation Partnership Project; Technical Specification Group Services and System Aspects; General Packet Radio Service (GPRS) Enhancements for Evolved Universal Terrestrial Radio Access Network (E-UTRAN) Access (Release 11)," 3GPP TS 23.401 V11.0.0, Dec. 2011, 287 pages.

(Continued)

*Primary Examiner* — Dede Zecher
*Assistant Examiner* — Trang Doan
(74) *Attorney, Agent, or Firm* — Ryan, Mason & Lewis, LLP

(57) ABSTRACT

Techniques are disclosed for establishing secure communications between computing devices utilizing proximity services in a communication system. For example, a method for providing secure communications in a communications system comprises the following steps. At least one key is sent from at least one network element of an access network to a first computing device and at least a second computing device. The first computing device and the second computing device utilize the access network to access the communication system and are authenticated by the access network prior to the key being sent. The key is useable by the first computing device and the second computing device to securely communicate with one another when in proximity of one another without communications between the first computing device and the second computing device going through the access network.

22 Claims, 5 Drawing Sheets

(56) References Cited

U.S. PATENT DOCUMENTS

| | | | | |
|---|---|---|---|---|
| 2012/0243437 | A1* | 9/2012 | Horn | H04W 76/023 370/254 |
| 2014/0122607 | A1* | 5/2014 | Fodor | H04W 4/005 709/204 |
| 2014/0219261 | A1* | 8/2014 | Johnsson | H04W 76/023 370/338 |

OTHER PUBLICATIONS

3GPP, "3rd Generation Partnership Project; Technical Specification Group Services and System Aspects; 3G Security; Lawful Interception Architecture and Functions (Release 11)," 3GPP TS 33.107 V11.0.0, Sep. 2011, 136 pages.

3GPP, "3rd Generation Partnership Project; Technical Specification Group Services and System Aspects; 3G Security; Handover Interface for Lawful Interception (LI) (Release 11)," 3GPP TS 33.108 V11.0.0, Jun. 2011, 193 pages.

3GPP, "3rd Generation Partnership Project; Technical Specification Group SA; Feasibility Study for Proximity Services (ProSe) (Release 12)," 3GPP TR 22.803 V0,2.0, Feb. 2012, 17 pages.

3GPP, "3rd Generation Partnership Project; Technical Specification Group Services and System Aspects; 3G Security; Security Architecture (Release 11)," 3GPP TS 33.102 V11.0.0, Sep. 2011, 71 pages.

3GPP, "3rd Generation Partnership Project; Technical Specification Group Services and System Aspects; 3GPP System Architecture Evolution (SAE); Security Architecture (Release 11)," 3GPP TS 33.401 V11.0.0, Jun. 2011, 115 pages.

Standards for Efficient Cryptography Group, "Secure Hash Standard," Federal Information Processing Standards Publication 180-2 (Aug. 2002) with Change Notice 1 (Feb. 2004), 83 pages.

\* cited by examiner

SECURE COMMUNICATIONS FOR COMPUTING DEVICES UTILIZING PROXIMITY SERVICES

FIELD

The field relates to communication security associated with computing devices utilizing proximity services.

BACKGROUND OF THE INVENTION

Traditional broadband communication network design has been focused on enabling communication services among users, such that the user traffic always traverses the network core infrastructure (i.e., core network or CN). See, e.g., 3GPP TS 23.401, 3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 11), the disclosure of which is incorporated by reference herein in its entirety.

Such a design approach offers some user management benefits to network operators, such as the ability to authenticate the user equipment (UE), and to track the user behavior in terms of resource utilization (e.g., such as bandwidth consumption on the air interface and amount of data traffic uploaded/downloaded over time).

In addition, enforcing traffic to traverse the core of the broadband network enables the support of Lawful Interception (LI) of data and/or voice calls by law authorities. This is because the CN has explicit access to user traffic (since such traffic goes through the core) and thus can provide mechanisms to LI entities for obtaining the traffic exchanged between specific users, upon request. See, e.g., 3GPP TS 33.107, 3rd Generation Partnership Project; Technical Specification Group Services and System Aspects; 3G Security; Lawful Interception architecture and functions (Release 11]; and 3GPP TS 33.108, 3rd Generation Partnership Project; Technical Specification Group Services and System Aspects; 3G Security; Handover interface for Lawful Interception (LI) (Release 11), the disclosures of which are incorporated by reference herein in their entireties.

SUMMARY

Embodiments of the invention provide techniques for establishing secure communications between computing devices utilizing proximity services in a communication system.

For example, in one embodiment of the invention, a method for providing secure communications in a communications system comprises the following steps. At least one key is sent from at least one network element of an access network to a first computing device and at least a second computing device. The first computing device and the second computing device utilize the access network to access the communication system and are authenticated by the access network prior to the key being sent. The key is useable by the first computing device and the second computing device to securely communicate with one another when in proximity of one another without communications between the first computing device and the second computing device going through the access network.

In another embodiment of the invention, a method for providing secure communications in a communications system comprises the following steps. At least one key is received at a first computing device from at least one network element of an access network sent to the first computing device and at least a second computing device. The first computing device and the second computing device utilize the access network to access the communication system and are authenticated by the access network prior to the key being sent. The key is utilized by the first computing device to securely communicate with the second computing device, when the first computing device and the second computing device are in proximity of one another, without communications between the first computing device and the second computing device going through the access network.

Advantageously, techniques of the invention provide for secure communications between proximity devices (i.e., computing devices utilizing proximity services) in a communication system.

These and other objects, features and advantages of the present invention will become apparent from the following detailed description of illustrative embodiments thereof, which is to be read in connection with the accompanying drawings.

DETAILED DESCRIPTION

Embodiments of the invention will be described below in the context of illustrative communications protocols. However, it is to be appreciated that embodiments of the invention are not limited to any particular communications protocols. Rather, embodiments of the invention are applicable to any suitable communication environment where it would be desirable to provide secure communications between computing devices utilizing proximity services.

The term "key" as used herein is generally defined as an input to a cryptographic protocol, for purposes such as, but not limited to, entity authentication, privacy, message integrity, etc.

The phrase "security association" as used herein generally refers to a security definition in a communication environment across which two or more parties and/or devices communicate. In one example, the security definition may include, but is not limited to, a session key.

The phrase "proximity services" as used herein is generally defined as network controlled discovery and communications between computing devices that are in a proximity of one another, so that user traffic flows between the devices rather than via the network. Being in a proximity of one another generally refers to the devices being in a distance range of one another within which communication is possible between the devices (i.e., within each other's coverage range) without the communications going through the network.

Figure 1A:
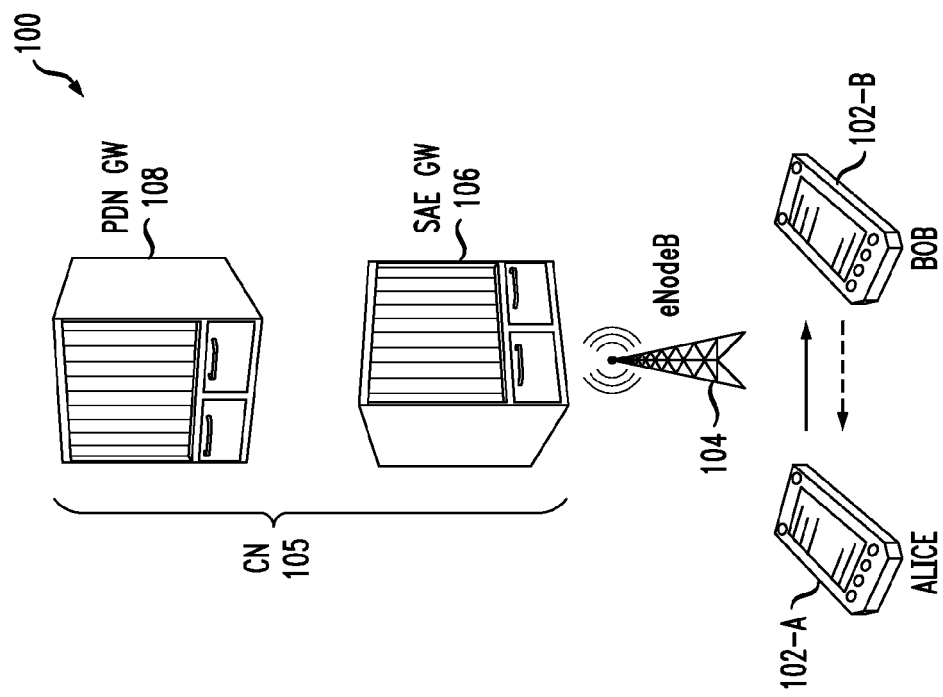
FIG. 1A illustrates user plane traffic traversal in a broadband communication system in a traditional-based scenario.

It is realized that forcing user traffic to always go through the CN, as in a traditional-based approach, introduces significant limitations and overheads in certain deployment scenarios. FIG. 1A illustrates user plane traffic traversal in a broadband communication system in such a traditional-based scenario. The broadband communication system depicted in the figure is a Long Term Evolution (LTE) network. As is known, LTE is a 4$^{th}$ Generation (4G) network developed by the 3$^{rd}$ Generation Partnership Project (3GPP).

Let us consider the case where two subscriber devices of the same Long Term Evolution (LTE) network 100, namely Alice 102-A and Bob 102-B, which are attached to the same eNB base station (e-Node B) 104, wish to establish a data communication session so that they can initiate a video call over the LTE network. Note that reference numerals 102-A and 102-B may be alternately referred to herein as devices, computing devices, communication devices, subscriber devices, end-user devices, user equipment (UEs), and the like. By way of example only, the devices 102-A and 102-B may be mobile end-user devices such as, but not limited to, cellular phones, laptops, tablets, and the like.

In a traditional LTE setting, packets for Alice (device 102-A) and packets for Bob (device 102-B) would be exchanged via the LTE core network (CN) 105, i.e., traverse the Serving Gateway (SGW) 106 and the Packet Data Network (PDN) Gateway (PGW) 108, as shown in FIG. 1A. Note that while Alice (device 102-A) and Bob (device 102-b) are within each other's transmission range, Alice's packets travel via eNB 104 (typically up to PGW 108) and from there they return back to the same eNB 104 and are delivered to Bob. Given that multiple such communications (among neighbor users) may take place simultaneously, enforcing such traffic traversal via the core increases the utilization of both the radio access network (RAN) entities (e.g., eNB) and the CN entities (e.g., SGW and PGW), and additionally consumes excessive amounts of both backhaul and wireless bandwidth.

Figure 1B:
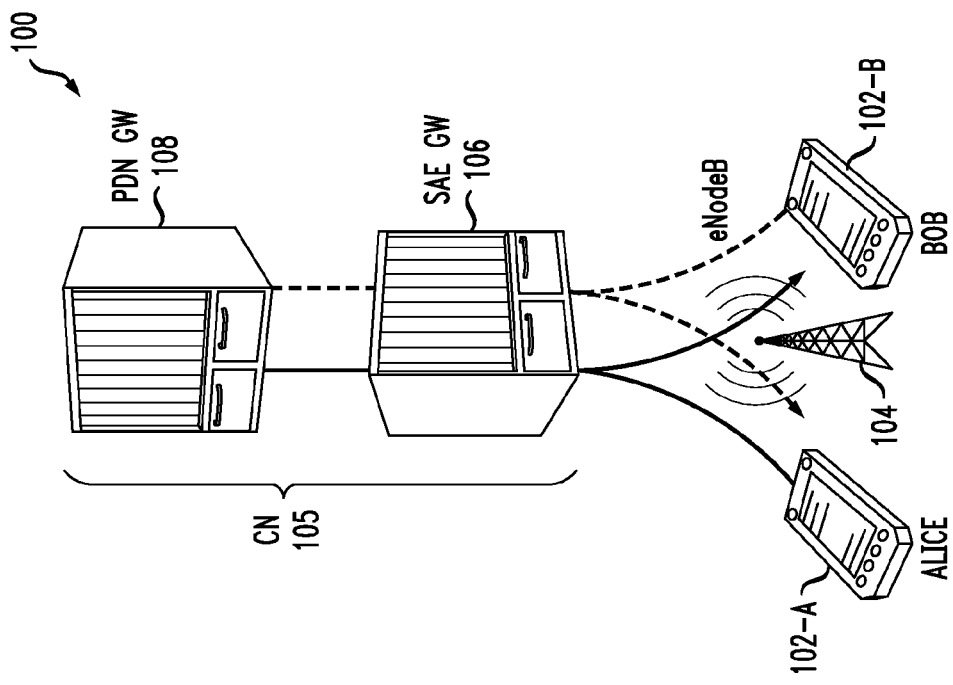
FIG. 1B illustrates user plane traffic traversal in a broadband communication system in a proximity services-based scenario.

For deployment scenarios where Alice (device 102-A) and Bob (device 102-B) are "neighbors" (i.e., within each other's coverage range), proximity services (ProSe), such as those described in 3GPP TR 22.803, 3rd Generation Partnership Project; Technical Specification Group SA; Feasibility Study for Proximity Services (ProSe) (Release 12), the disclosure of which is incorporated by reference herein in its entirety, increase the channel capacity by enabling direct device-to-device (D2D) traffic session establishment and data exchange among Alice and Bob (or even among a group of more than two users). FIG. 1B illustrates user plane traffic traversal in an LTE network 100 in a proximity services-based scenario. Note that devices 102-A and 102-B may also be referred to as "proximity devices" when engaging in proximity services-based (ProSe) functions.

As one may observe with ProSe, Alice (device 102-A) sends packets directly to Bob (device 102-B) over the air interface, without the need to involve either the RAN or the CN infrastructure. This offers two main advantages: (i) it offloads the network in terms of data traffic management operations, and (ii) it can increase the end-user throughput when the direct data link between Alice and Bob sustains a higher Packet Delivery Ratio (PDR) than the Alice-eNB and/or Bob-eNB links. ProSe thereby enables high-rate mobile Internet applications such as, but not limited to, real-time video streaming and online gaming.

However, it is realized that ProSe communications introduce some critical security considerations, which do not exist with traditional broadband network deployments:

i. In traditional settings, the cellular network performs mutual authentication with Alice (device 102-A) and Bob (device 102-B) individually, and further establishes separate, unique security credentials (e.g., session keys) with each of them. See, e.g., 3GPP TS 33.102, 3rd Generation Partnership Project; Technical Specification Group Services and System Aspects; 3G Security; Security architecture (Release 11); and 3GPP TS 33.401, 3rd Generation Partnership Project; Technical Specification Group Services and System Aspects; 3GPP System Architecture Evolution (SAE); Security architecture (Release 11), the disclosures of which are incorporated by reference herein in their entireties. The established keys are used to protect control signaling (e.g., Non Access Stratum (NAS) signaling) and can be optionally used to protect the traffic over the air interface, between eNB and each UE. Since established security credentials are separate and unique Alice and Bob do not know each other's session keys. However, as stated above with ProSe, Alice and Bob communicate directly and not via the network. Therefore, it is realized that a method is needed with which the direct communication between Alice and Bob is secured using session keys that are known to both Alice and Bob. Otherwise, Alice and Bob cannot perform cryptographic operations such as encryption and decryption on their exchanged packet data.

ii. 3G and 4G network standards (see, e.g., 3GPP TS 33.102 and 3GPP TS 33.401, as cited above) specify functions with which the RAN can verify the source (attached UE) of uplink traffic, via the use of session keys established during authentication between UE and network. With this, the network can be assured that only authenticated UEs are authorized to use the licensed wireless bandwidth. However, with ProSe, user-plane (UP) traffic flows over the direct wireless link between UEs. As a consequence, although each UE may still be authenticated by the network, the latter has no way of determining whether UEs engaging in ProSe communications are actually authorized to do so. This is because with ProSe, the network cannot explicitly track user traffic given that the traffic does not flow through RAN or core entities.

iii. Taking the above observation further, since with ProSe, Alice (device 102-A) and Bob (device 102-B) exchange traffic directly, the network is now incapable of performing functionalities that enable Lawful Interception (LI). However, as explained above, this is not a problem with traditional 3G and 4G networks, since user traffic traverses the CN, thereby allowing appropriate interfaces for LI purposes. Therefore, given that ProSe communications are subject to LI, it is realized that a mechanism is needed such that LI is feasible in ProSe settings.

Accordingly, one or more embodiments of the invention provide secure proximity services. In an illustrative embodiment, a secure ProSe (SeProSe) methodology is provided which establishes security associations between ProSe-capable UEs (computing devices such as Alice and Bob referred to above) in a way that addresses the above and other security issues. The methodology provides the following functions:

a. ProSe authorization and security establishment for ProSe links. With SeProSe, each UE performs authentication and key agreement with the access network in the same way as already specified. Moreover, whenever Alice (device 102-A) wishes to establish a ProSe link with her neighbor Bob (device 102-B), the associated network verifies that Alice and Bob are authorized for ProSe and, if they are, then the network securely provision(s) a common secret key to both Alice and Bob. We call this key "PK." Secure provisioning of this key leverages the key material that is established during the preceding authentication and key agreement procedure between each UE and its affiliated network. Alice and Bob use this common key towards securing their direct communication. Note that each user receives the common key in an encrypted form by the attached (and authenticated) network. Thus, Alice is certain that Bob has also been authenticated by his affiliated network and authorized to use ProSe, since he is in possession of the same PK key.

b. User verification and monitoring. Use of PK provides the way for the network to verify that the ProSe-capable UE is authorized to make use of the wireless licensed spectrum. However, in order for the network to be able to perform such verification, the UE's UP (user plane or direct) traffic must be reachable by the network. SeProSe includes a mechanism as per which the ProSe-capable UE transmits traffic using a transmission power level and a physical-layer (PHY) bit rate such that the associated network can successfully overhear ProSe traffic. Note that such a transmission mode clearly enables the support of LI, since the network now obtains the ability to access the data exchanged directly between UEs. Observe that in the deployment scenarios where LI support is not needed, this mechanism does not need to be used.

While alternative embodiments of the invention are not limited thereto, the following set of assumptions is made in accordance with illustrative embodiments to be described below. Also note that such assumptions define a threat model. It is assumed that:

i. Each ProSe-capable UE has the ability to maintain separate traffic paths with at least one base station at all times (e.g., eNodeB for the case of LTE). Each such UE is able to tune its transmission power and PHY bit rate in order to compensate with wireless interference.

ii. Prior to initiation of ProSe traffic, UEs are within the coverage range of at least one base station operated by the network service provider with which they are associated. Each ProSe-capable UE may be attached to a different base station.

iii. Associated broadband network infrastructures (RAN and CN) are not compromised in terms of securely computing, storing and provisioning secret credentials, such as permanent and session keys. Similarly, UEs are not compromised in terms of computing, deriving or disclosing permanent or temporary secret credentials.

iv. A UE that has mutually authenticated with a network and has derived/obtained key material based on such authentication and key agreement process, trusts that any secured information sent to UE by the network is authentic and true. Similarly, in such a case, the network trusts the authenticated UE to always send accurate and true ProSe-related information to the network.

In accordance with illustrative embodiments, protocols and methodologies will be described below for deriving and distributing ProSe security context, followed by a description of how Lawful Interception (LI) is supported when UEs operate in ProSe mode.

It is to be appreciated that while illustrative embodiments described herein focus on the case where ProSe communications take place in the context of LTE (i.e., it is assumed that the supporting network infrastructure is LTE based), many of the functionalities of SeProSe are applicable in other types of networks such as, but not limited to, Universal Mobile Telecommunications System (UMTS) and High Rate Packet Data (HRPD).

Illustrative embodiments of the invention provide a solution which ensures that direct communication between two ProSe-capable UEs is secured. This includes methods for: (i) generation and distribution of session keys used for securing direct communication between two ProSe capable UEs; and (ii) verification that both ProSe-capable UEs involved in ProSe communications are authenticated by their respective networks and authorized for the use of ProSe.

We consider a scenario in which two subscribers of the same LTE network, namely Alice and Bob (devices 102-A and 102-B, respectively, as shown in FIGS. 1A and 1B), wish to establish a ProSe communication. As in traditional settings, at some point prior to ProSe communication, the cellular network has performed mutual authentication with Alice and Bob individually, and has established separate, unique security credentials (e.g., session keys) with each of them. Subsequently, using ProSe discovery features, Alice discovers that Bob is in her proximity and wishes to establish ProSe communication with him. To establish ProSe communication, Alice's UE sends a request to the Radio Access Network (RAN) indicating that she wants to establish ProSe communication with Bob. Upon verifying that Alice is an authenticated subscriber, Alice's RAN network verifies that Alice is authorized for ProSe services. If both verifications are successful, the RAN network further verifies that Bob is an authenticated user authorized for ProSe communication. If that is the case, RAN derives session key PK using Alice's security context (i.e., $K_{Alice}$) as follows:

$$PK=KDF(K_{Alice},S),$$

where S is a string constructed using predetermined input parameters, and KDF is a Key Derivation Function (see, e.g. SHA-256, Standards for Efficient Cryptography Group, "Secure Hash Standard", Federal Information Processing Standards Publication 180-2, August 2002, with Change Notice 1, February 2004, the disclosure of which is incorporated by reference herein in its entirety). Once RAN derives the PK, it sends it securely to Alice and Bob.

Figure 2A:
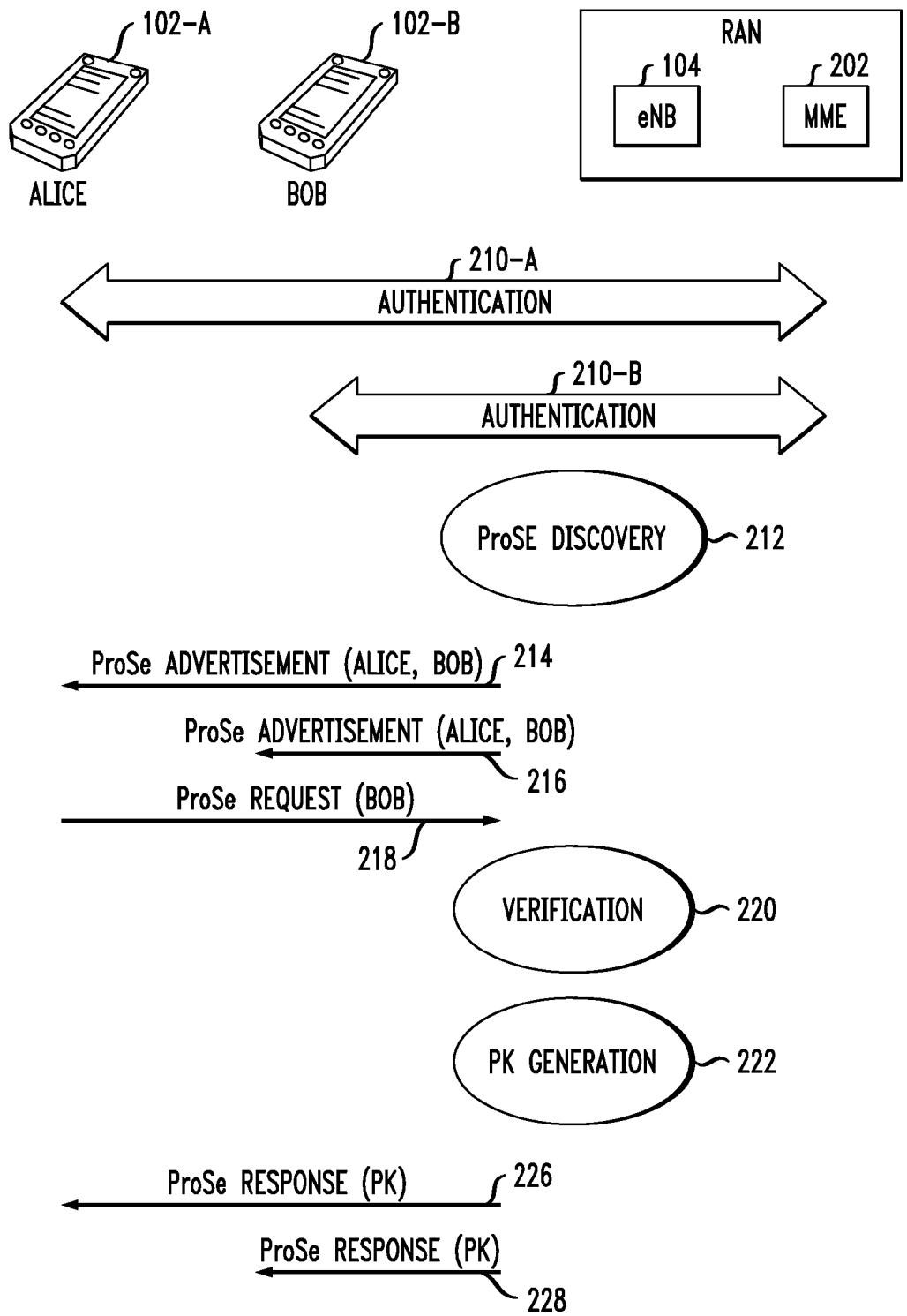
FIG. 2A illustrates a proximity services-based key derivation and distribution protocol, according to an embodiment of the invention.

FIG. 2A illustrates a proximity services-based key derivation and distribution protocol, according to an embodiment of the invention. In particular, FIG. 2A depicts the case where ProSe-capable UEs are attached to the same eNB. That is, as shown, Alice (device 102-A) and Bob (device 102-B) are in the coverage range of the same eNB 104.

As described above, Alice and Bob are authenticated users of an operator's network. Such authentication operations are depicted as 210-A and 210-B in FIG. 2A. In addition, in the example of FIG. 2A, Alice and Bob are in the coverage range of the same eNB (i.e., they are attached to the same eNB). ProSe discovery is performed in step 212.

With SeProSe (secure ProSe), once Alice and Bob receive an advertisement that they are within the range of each other (depicted as steps 214 and 216 in FIG. 2A), Alice determines whether she would like to initiate ProSe communication with Bob. If this is the case, Alice (device 102-A) sends a ProSe request (in step 218 in FIG. 2A) to the eNB 104 indicating that she wishes to initiate the ProSe communication with Bob (device 102-B). The attached eNB verifies (in step 220 in FIG. 2A) that both Alice and Bob are authenticated and authorized to use ProSe.

In order for Alice and Bob to engage in ProSe communication, they need to be authenticated first, (e.g., as per the AKA (Authentication and Key Agreement) procedure in the case of LTE see 3GPP TS 33.102, 3rd Generation Partnership Project; Technical Specification Group Services and System Aspects; 3G Security; Security architecture (Release 11); and 3GPP TS 33.401, 3rd Generation Partnership Project; Technical Specification Group Services and System Aspects; 3GPP System Architecture Evolution (SAE); Security architecture (Release 11), the disclosures of which are incorporated by reference herein their entireties). Authentication between Alice and the network is depicted as step 210-A, and authentication between Bob and the network is depicted as step 210-B in FIG. 2A. Note that a mobility management entity (MME) 202 in the RAN is used to assist with authentication.

Upon successful authentication, eNB 104 maintains an active security context for each attached UE and hence, upon reception of a ProSe request sent by Alice (step 218), eNB 104 can determine whether she is already authenticated by examining the corresponding authentication server (AS not expressly shown) security context (which is locally maintained at eNB). Note here that, using key material from this security context, Alice may encrypt and/or integrity protect the ProSe request, e.g., either using her $K_{RRCint}/K_{RRCenc}$ key if the ProSe request is a Radio Resource Control (RRC) message, or $K_{UPint}/K_{UPenc}$ key if it is a UP (user plane) message, or $K_{NASint}/K_{NASenc}$ if it is an NAS (non access stratum) message. In the latter case, the authenticity of the ProSe request is verified by MME 202 in the RAN using the corresponding (valid) NAS security request, which is locally maintained at MME 202.

Upon verification that Alice and Bob are authenticated, eNB 104 determines whether they are authorized to engage into ProSe communication. Verification of authorization may be performed using authorization information that is locally maintained at eNB 104 (in step 220). Such information may be proactively obtained by eNB upon successful UE registration with the network, along with other registration parameters.

If the verification is successful, eNB 104 generates PK (in step 222 in FIG. 2A) as defined above. $K_{Alice}$ in the computation of PK may be: (i) any of the other keys maintained by eNB (e.g., $K_{eNB}$, $K_{RRCenc}$, $K_{RRCint}$, $K_{UPenc}$, $K_{UPint}$); (ii) a combination of two or more keys; (iii) a randomly derived value; or (iv) ProSe key ($K_{ProSe}$) derived and delivered by the MME to eNB upon successful authentication of ProSe authorized UE. Subsequently, the eNB 104 sends PK to Alice and Bob (in steps 226 and 228, respectively, in FIG. 2A). To ensure secure RRC communication between eNB-Alice and eNB-Bob, the security context derived from successful authentication (i.e., $K_{RRCint}$ and $K_{RRCenc}$) is used. At this point, Alice and Bob can start ProSe communication, which is secured using PK.

Observe that by receiving the PK, Alice and Bob are assured that the other party is authorized to use ProSe, i.e., eNB sends PK to Alice and Bob only after verification that they are both authorized to engage into ProSe communication. Hence, reception of PK serves as proof to Alice that Bob is also authorized.

Observe also that by mutually verifying the possession of PK, Alice and Bob are assured that they are communicating with each other.

Alice and Bob may use PK for securing their ProSe communication, or key derivatives of PK for more fine-grained ProSe security and authorization. Recall that PK is used only for securing traffic that is directly exchanged between Alice and Bob. Any communication between Alice-eNB and Bob-eNB is (optionally) protected using the AS security context corresponding to each UE. The PK key may be used for securing ProSe communication between Alice and Bob in one or more of the following illustrative ways:

a. Use of single key for all ProSe traffic. With this option, Alice and Bob use PK directly for encrypting and/or integrity protecting traffic that flows on their direct communication link.

b. Use of separate key derivatives for encryption and integrity protection. SeProSe provides the ability to Alice and Bob to use PK for deriving separate keys for encryption ($PK_{enc}$) and integrity protection ($PK_{int}$). For this, two different KDFs can be used as follows:

$PK_{enc}=KDF_1(PK,S)$, and $PK_{int}=KDF_2(PK,S)$, where S is a string constructed using predetermined input parameters. In fact, each UE can derive $PK_{enc}$ and $PK_{int}$ by re-using the key derivation functions that are already implemented and used for derivation of other keys, such as $K_{RRCenc}$, $K_{RRCint}$, $K_{UPint}$, and $K_{UPenc}$.

c. Use of ProSe application-specific key derivatives. When UEs are provisioned with more than one ProSe application, the operator may wish to perform application-specific authorization for access to proximity services. For example, Alice may be allowed to access ProSe for specific applications only (i.e., Alice may not be authorized to access ProSe for all applications). In such a case, assuming that the ProSe-capable UE can reliably restrict the use of application keys to the corresponding applications, SeProSe allows the derivation and use of application-specific keys using PK. More specifically, eNB securely sends PK to each ProSe-capable UE, along with a list of applications that the UE is authorized to use. Each UE can use PK to derive an application-specific key $PK_A$, using the following formula:

$PK_A=KDF(PK,S)$, where S is a string constructed using predetermined input parameters, potentially including the particular application identifier. Note that, alternatively, eNB can derive a PK per ProSe application and send it to each UE. In other words, instead of a single PK, multiple PK keys (one per application) may be sent to each UE.

d. Hybrid use of PK. SeProSe also allows the derivation of keys for encryption and integrity protection per ProSe application as follows:

$PK_{Aenc}=KDF_1(PK_A,S)$, and $PK_{Aint}=KDF_2(PK_A,S)$.

Figure 2B:
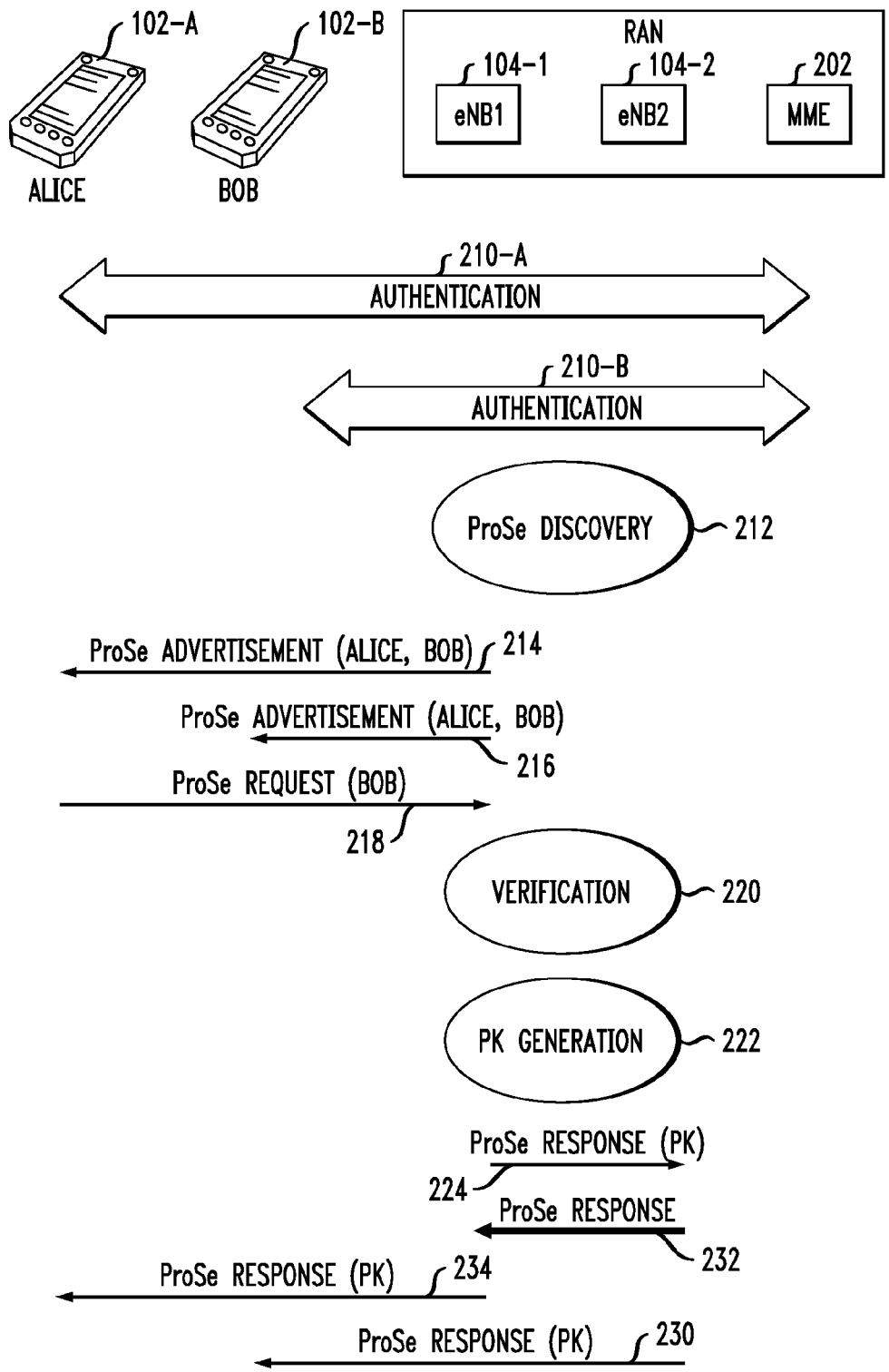
FIG. 2B illustrates a proximity services-based key derivation and distribution protocol, according to another embodiment of the invention.

FIG. 2B illustrates a proximity services-based key derivation and distribution protocol, according to another embodiment of the invention. In particular, FIG. 2B depicts the case where ProSe-capable UEs are attached to different eNBs. That is, as shown, Alice (device 102-A) and Bob (device 102-B) are within coverage of two different eNBs 104-1 and 104-2. Similar to the scenario depicted in FIG. 2A, in this scenario, Alice and Bob are authenticated users of an operator's network. However, here Alice and Bob are in the coverage range of two different eNBs. Note that the same reference numerals are used in FIG. 2B as are used in FIG. 2A for steps/operations that are the same or substantially similar. New reference numerals are added to denote further steps and/or a change in order of steps.

Thus, once Alice and Bob receive advertisements that they are within the range of each other (steps 214 and 216), Alice determines whether she would like to initiate ProSe communication with Bob. In such a case, Alice sends (step 218) a ProSe request to eNB1 (104-1) indicating that it wishes to initiate the ProSe communication with Bob. eNB1 determines (step 220) whether Alice is authenticated and authorized to use ProSe, as described above. If the verification is successful, eNB1 generates PK (step 222) as described above.

Subsequently, in step 224, eNB1 (104-1) sends PK to eNB2 (104-2) over the X2 interface, along with the identity of Alice and Bob. Once eNB2 receives this message, it is implicitly assured that Alice has been authenticated by eNB1. Further, eNB2 determines (step 220) whether Bob is authenticated and authorized to use ProSe. If the verification is successful, eNB2 performs the following:

a. eNB2, in step 230, securely sends PK (which was derived and sent by eNB1) to Bob using a valid security context derived from successful authentication.

b. eNB2, in step 232, responds to eNB1 with a message verifying that Bob is also authenticated and authorized for ProSe.

Upon reception of eNB2's response over the X2 interface, eNB1 is assured that Bob is also authenticated and hence, eNB1 further (securely) provisions PK to Alice (in step 234).

At this point, Alice and Bob can start ProSe communication secured using PK. Same as in case with a single eNB, by receiving the PK, Alice and Bob are assured that the other party is authorized to use ProSe, while with proving to each other the possession of PK, Alice and Bob are assured that they are communicating with each other. Similarly in this case, PK can be used by Alice and Bob either as a single key used for encryption and integrity protection of direct ProSe traffic, or it can be used for derivation of further keys, as described above.

Note that the above illustrative descriptions have focused on scenarios involving two ProSe-capable UEs. Clearly however, the described procedures are directly applicable in cases where more than two ProSe-capable UEs wish to engage in a group communication. In such a case, all members of the group will receive the same PK from their attached eNB. Again, in such a case, possession of PK implicitly authenticates a UE to all other members of the group, and also allows all other group members to verify that a particular UE is authorized to participate in the group ProSe communication.

Furthermore, security protocols and methodologies described herein may be in scenarios when ProSe-capable UEs are associated with different Public Land Mobile Network (PLMN) domains. In particular, assume that Alice (device 102-A) and Bob (device 102-B) are within coverage of two different eNBs that belong to two different PLMN domains. It is to be understood that methods described above are applicable in this scenario as long as there is a way of communication (e.g., X2 interface or via MME) between the eNBs belonging to these two PLMN domains.

It is further realized that when ProSe-capable UEs communicate with each other, they may tune their transmission parameters based on their channel characteristics. As an example, if two such UEs, say Alice and Bob, are in close proximity to each other, then Alice may use a high PHY bit rate and a low transmission power for sending traffic to Bob. With such transmission parameters, however, Alice's signals may be weak enough so that the associated eNB may not be able to decode them successfully. As a result, the eNB may not be able to track Alice and Bob. Moreover, lawful interception (LI) is a challenge in such cases.

In order to make user tracking by the eNB as well as LI feasible, embodiments of the invention provide a channel feedback mechanism with which Alice's and Bob's signals are transmitted strong enough so that they can be decoded by the eNB(s) to which they are attached. This mechanism is illustrated in the methodology of FIG. 3.

Figure 3:
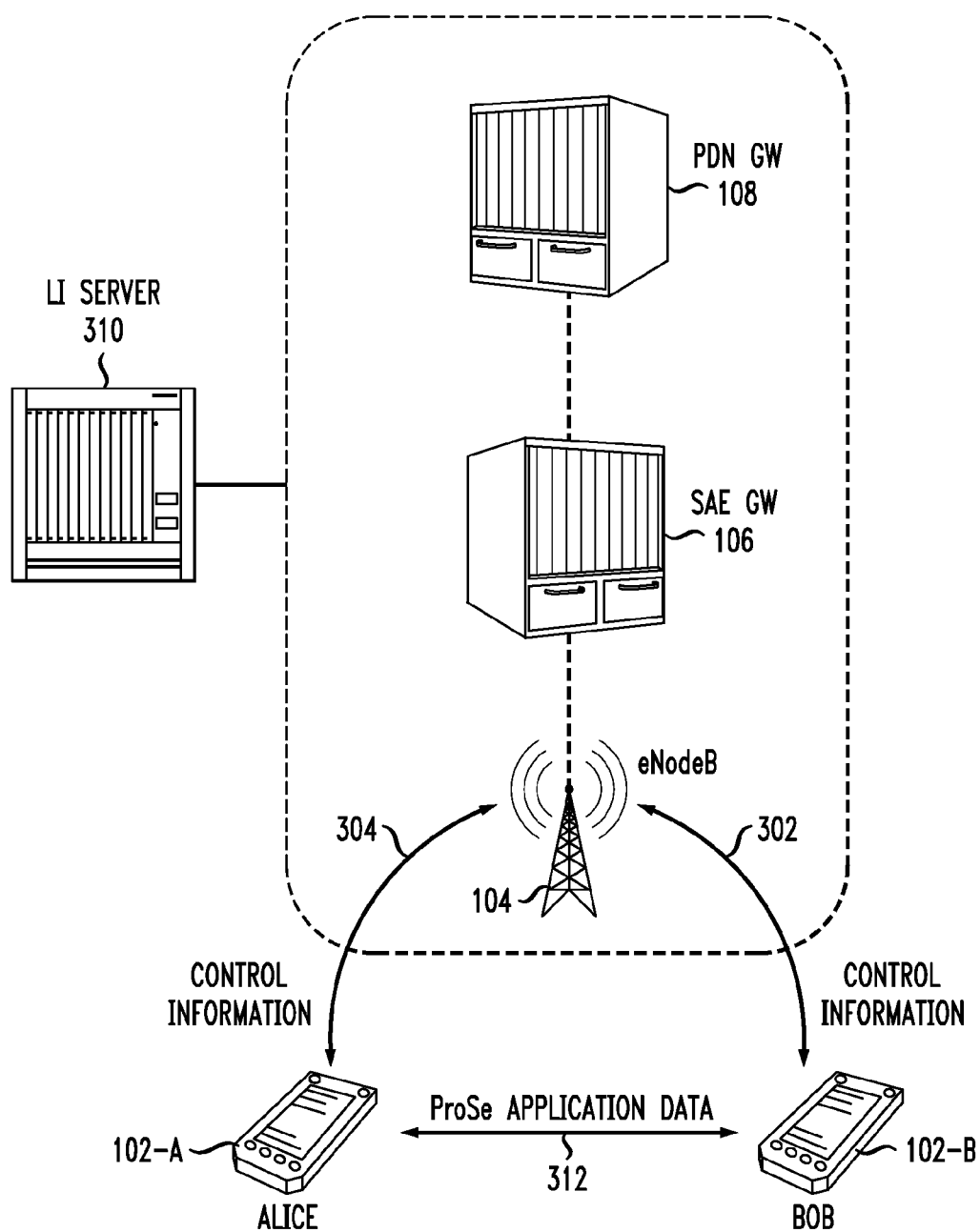
FIG. 3 illustrates a proximity services-based secure communications methodology in accordance with the presence of lawful interception operations, according to an embodiment of the invention.

More specifically, as shown in FIG. 3, Alice (device 102-A) and Bob (device 102-B) do not exchange channel (and other control) information directly, but through the network infrastructure. In other words, in order for Bob to inform Alice about his observed link properties, he does not use the ProSe communication. Instead, Bob sends this information (302 in FIG. 3) to his attached eNB (104), which further relays the information to Alice (either directly when Alice is attached to the same eNB (304 in FIG. 3), or via Alice's eNB over the X2 interface). Similarly, Alice informs Bob about her observed channel properties via the network infrastructure (path 304 to 302). Conveying such information using the network offers the following advantages:

a. It allows the network operator to control the session duration between Alice and Bob (e.g., for charging purposes). In particular, unless Alice and Bob receive channel information and parameters from their eNB, they cannot tune their communication (transmission and reception) parameters and therefore they cannot exchange traffic. With this, the network obtains a way to control the duration of a ProSe session, i.e., the session is terminated as soon as the eNB stops sending channel parameter information to Alice and Bob. An example of such parameter information could be the transmission power and the PHY bit rate for transmission. In such a case, the eNB informs Alice that she should use a specific transmission power and a specific PHY bit rate for transmitting packets to Bob. Clearly, other critical communication parameters could be sent instead/additionally.

b. It enables the network operator to provision ProSe communication parameters to Alice and Bob, such that the eNB is able to overhear ProSe communications. Specifically, when the eNB informs Alice about Bob's channel feedback information, the eNB may convey ProSe communication parameters such that: (a) Alice and Bob can use the parameters to successfully establish and maintain ProSe communication; and (b) the eNB is also able to overhear the communication between Alice and Bob. In other words, although Bob may convey channel parameters which can potentially offer high performance gains on the Alice-Bob link, the eNB may provide different parameters to Alice, which may not be as conducive for high performance (e.g., high throughput on the Alice-Bob link), but which allow the eNB to overhear Alice's and Bob's traffic. Note that based on network policy, the eNB may decide that only Alice or only Bob should transmit such that the eNB can overhear transmitted messages. In such a case, the eNB provides appropriate parameters accordingly to each of them, depending on which device the eNB wishes to track.

Given this, one embodiment of the SeProSe scheme includes a process as per which the eNB sends ProSe communication parameters to each ProSe-capable UE (paths 302 and 304 in FIG. 3), such that the eNB is able to overhear the user traffic for monitoring and LI purposes. Provisioning of such parameters may leverage the same message exchange procedures as the ones already standardized for the communication between UE and eNB (e.g., the same packet formats used for the transmission of Continuous Quality Improvement (CQI) information between UE and eNB).

As long as the eNB can overhear the ProSe traffic, such traffic can be further forwarded to LI entities (e.g., LI server 310 in FIG. 3) that are interfacing with the network infrastructure. The following is to be noted:

a. Overheard ProSe traffic may be forwarded all the way up to the PDN GW 108 for further offline processing and updating of the user session records, in case the operator wishes to re-use PGW's user records for ProSe user monitoring.

b. Overhearing the ProSe communication does not require any modification of UE reported values by the eNB. This would typically be the case when the direct link between UEs (e.g., the Alice-Bob link) has a poorer quality than the link between each UE and eNB. In such a case, eNB would be able to overhear the ProSe communication by default, since communication parameters would be sufficient for the eNB to overhear the ProSe traffic.

c. Clearly, when user traffic does not need to be tracked or overheard by the network, no modification in communication parameters by the eNB is needed.

d. When Alice conveys channel information to her associated eNB, it is possible that Bob will receive the same information, given that Alice's transmission is successfully decoded by Bob. If UEs are not trusted, then Alice could ignore the recommendations of the eNB for setting her transmission parameters, and could instead make use of the overheard feedback that was originally sent by Bob. In order to avoid such behavior with SeProSe, the eNB may request Alice and Bob to encrypt their control information before sending it to the eNB, using the key material ($K_{RRCenc}$) that was derived during the most recent authentication and key agreement procedure between UE and eNB.

e. In scenarios where ProSe communication performance is not of major importance, ProSe communications may take place using the exact same communication channel parameters as the ones on the UE-eNB link, assuming that the UE-eNB link has poorer quality than the UE-UE link (which will typically be the case; clearly, if the UE-eNB link has a better quality than the UE-UE link, the eNB will always be able to overhear the ProSe communication). As an example, there may be ProSe applications that do not require fast communications between UEs, such as text messaging and low-rate voice applications. Such applications may operate over links that do not need to use high bit rates. Such a link is illustrated in FIG. 3 as 312. In other words, using suboptimal transmission parameters (which however are sufficient for successful overhearing of ProSe communication) will not affect the performance of such applications. In such scenarios the use of suboptimal channel parameters for ProSe comes at no communication cost, while it allows the network to overhear the communication.

Figure 4:
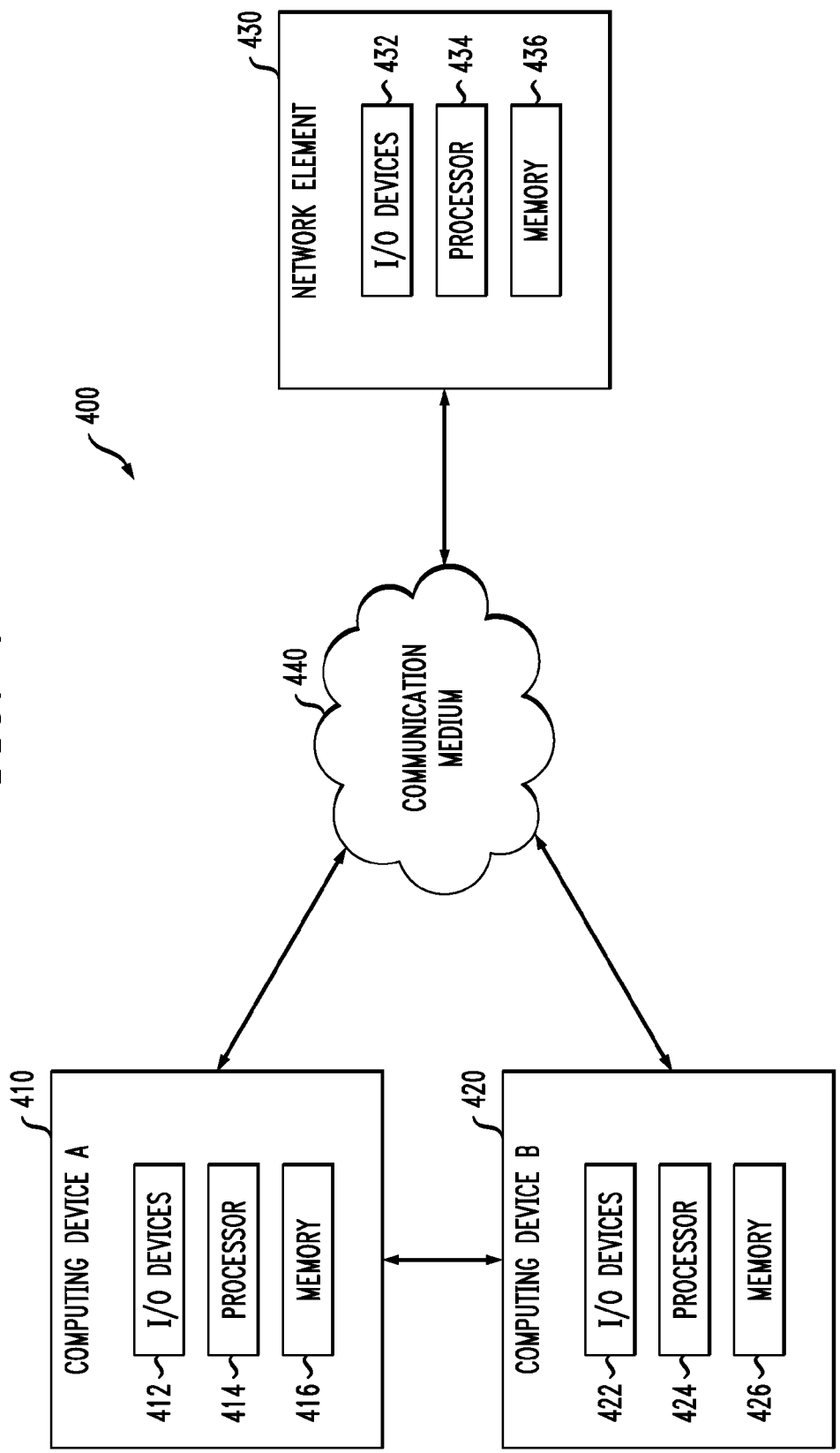
FIG. 4 illustrates a hardware architecture of a part of a communication system and computing devices suitable for implementing one or more of the methodologies and protocols according to one or more embodiments of the invention.

Lastly, FIG. 4 illustrates a generalized hardware architecture of a part of a communication system 400 suitable for implementing secure communications between proximity devices (i.e., computing devices utilizing proximity services) in a communication system according to embodiments of the invention.

As shown, computing device A 410 (e.g., corresponding to Alice or device 102-A) and computing device B 420 (e.g., corresponding to Bob or device 102-B), and network element 430 (e.g., corresponding to eNB 104, eNB1 104-1, eNB2 104-2, SAE GW 106, PDN GW 108 or MME 202) are operatively coupled via communication medium 440. The network medium may be any network medium across which the computing devices and the network element are configured to communicate. By way of example, the network medium can carry Internet Protocol (IP) packets and may involve any of the communication networks mentioned above. However, embodiments of the invention are not limited to a particular type of network medium.

As would be readily apparent to one of ordinary skill in the art, the elements may be implemented as programmed computers operating under control of computer program code. The computer program code would be stored in a computer (or processor) readable storage medium (e.g., a memory) and the code would be executed by a processor of the computer. Given this disclosure of embodiments of the invention, one skilled in the art could readily produce appropriate computer program code in order to implement the protocols and methodologies described herein.

Nonetheless, FIG. 4 generally illustrates an exemplary architecture for each device communicating over the communication medium. As shown, computing device A 410 comprises I/O devices 412, processor 414, and memory 416. Computing device B 420 comprises I/O devices 422, processor 424, and memory 426. Network element 430 comprises I/O devices 432, processor 434, and memory 436.

It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit. The I/O devices also represent transceivers (wireless and/or wired) that enable communications between the devices shown.

Accordingly, software instructions or code for performing the methodologies described herein may be stored in one or more of the associated memory devices, e.g., ROM, fixed or removable memory, and, when ready to be utilized, loaded into RAM and executed by the CPU. Such memory devices may each be considered a computer readable storage medium or a non-transitory storage medium. Each device (410, 420, and 430) shown in FIG. 4 may be individually programmed to perform their respective steps of the protocols and functions depicted in FIGS. 1A through 3. Also, it is to be understood that each of blocks 410, block 420, and block 430 may be implemented via more than one discrete node or computing device.

Advantageously, as described herein in accordance with illustrative embodiments, a method is provided for securing ProSe discovery and communications in the context of wireless broadband networks. SeProSe leverages the authentication and key agreement procedure performed between each UE and the network, for deriving security associations among UEs that wish to communicate directly. Such security association allows ProSe-capable UEs to authenticate each other. Meanwhile, SeProSe provides a way for the operator to authenticate the ProSe-capable UEs as well as to authorize the UEs for accessing ProSe. Furthermore, with SeProSe the operator is able to verify whether the ProSe-capable UEs that use ProSe are indeed authorized to do so, and also support lawful interception (LI) procedures when UEs operate in ProSe mode. In addition, SeProSe provides application-level granularity for secure sessions among UEs, by deriving session keys for individual SeProSe applications that are potentially offered by the network operator or by affiliated entities.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for providing secure communications in a communication system, comprising:

sending at least one key from at least one network element of an access network to a first computing device and at least a second computing device, wherein the first computing device and the second computing device utilize the access network to access the communication system and are authenticated by the access network prior to the at least one key being sent, and further wherein the at least one key is useable by the first computing device and the second computing device to securely communicate with one another when discovered to be in proximity of one another without communications between the first computing device and the second computing device going through the access network, wherein proximity discovery is controlled by the access network by:

sending, from the access network to the first computing device and the second computing device, an advertisement that indicates that the first computing device and the second computing device are within proximity of one another; and receiving, at the access network from one of the first computing device and the second computing device, a request to securely communicate with the other one of the first computing device and the second computing device without communications going through the access network.

2. The method of claim 1, wherein the key sent by the network element to the first computing device and the second computing device is generated based on one of: (i) a security context established during authentication of one of the first computing device and the second computing device by the access network; (ii) a key maintained at the network element; (iii) a combination of two or more keys; (iv) a randomly derived value; and (v) a proximity services-based key derived and delivered by a mobility management entity to the network element upon authentication of at least one of the first computing device and the second computing device.

3. The method of claim 2, wherein the one of the first computing device and the second computing device whose security context is used to generate the key is a communication-initiating computing device.

4. The method of claim 1, further comprising the network element, prior to sending the key to the first computing device and the second computing device, verifying that the first computing device and the second computing device are authorized to communicate with one another when in proximity of one another without their communications going through the access network.

5. The method of claim 1, further comprising the network element, prior to sending the key to the first computing device and the second computing device, determining whether the first computing device and the second computing device are within proximity of one another such that they can securely communicate without their communications going through the access network.

6. The method of claim 5, further comprising the network element, prior to sending the key to the first computing device and the second computing device, and after determining that the first computing device and the second computing device are within a proximity of one another such that they can securely communicate without their communications going through the access network, sending the advertisement to the first computing device and the second computing device that indicates that they are within proximity of one another such that they can securely communicate without their communications going through the access network.

7. The method of claim 1, further comprising the network element, after receiving the request, verifying that the first computing device and the second computing device are authenticated and authorized to securely communicate without their communications going through the access network.

8. The method of claim 7, further comprising the network element, after verifying that the first computing device and the second computing device are authenticated and authorized, generating the key.

9. The method of claim 1, wherein, when the first computing device is attached to the network element and the second computing device is attached to another network element of the access network, the network element sending the key to the first computing device and the other network element sending the key to the second computing device.

10. The method of claim 9, wherein the network element and the other network element are associated with different domains of the communication system.

11. The method of claim 1, further comprising the network element obtaining at least a portion of the communications between the first computing system and the second computing system that do not go through the access network.

12. The method of claim 11, further comprising performing lawful interception operations on the obtained communications.

13. The method of claim 11, further comprising the network element sending one or more communication parameters to the first computing device and the second computing device to enable the network element to obtain the communications between the first computing system and the second computing system that do not go through the access network.

14. An apparatus for providing secure communications in a communication system, comprising:

a memory; and a processor coupled to the memory forming at least a portion of a network element of an access network, the processor and the memory of the network element configured to:

send at least one key to a first computing device and at least a second computing device, wherein the first computing device and the second computing device utilize the access network to access the communication system and are authenticated by the access network prior to the at least one key being sent, and further wherein the at least one key is useable by the first computing device and the second computing device to securely communicate with one another when discovered to be in proximity of one another without communications between the first computing device and the second computing device going through the access network, wherein proximity discovery is controlled by the access network by:

sending, from the network element of the access network to the first computing device and the second computing device, an advertisement that indicates that the first computing device and the second computing device are within proximity of one another; and receiving, at the network element of the access network from one of the first computing device and the second computing device, a request to securely communicate with the other one of the first computing device and the second computing device without communications going through the access network.

15. The apparatus of claim 14, wherein the key sent by the network element to the first computing device and the second computing device is generated based on one of: (i) a security context established during authentication of one of the first computing device and the second computing device by the access network; (ii) a key maintained at the network element; (iii) a combination of two or more keys; (iv) a randomly derived value; and (v) a proximity services-based key derived and delivered by a mobility management entity to the network element upon authentication of at least one of the first computing device and the second computing device.

16. The apparatus of claim 14, wherein the processor and the memory of the network element are further configured to obtain at least a portion of the communications between the first computing system and the second computing system that do not go through the access network, such that lawful interception operations can be performed on the obtained communications.

17. The apparatus of claim 16, wherein the processor and memory of the network element are further configured to send one or more communication parameters to the first computing device and the second computing device to enable the network element to obtain the communications between the first computing system and the second computing system that do not go through the access network.

18. The apparatus of claim 14, wherein the network element is a base station, and the first computing device and the second computing device are mobile end-user devices.

19. A method for providing secure communications in a communication system, comprising:
    receiving, at a first computing device, at least one key from at least one network element of an access network sent to the first computing device and at least a second computing device, wherein the first computing device and the second computing device utilize the access network to access the communication system and are authenticated by the access network prior to the at least one key being sent; and
    utilizing the at least one key at the first computing device to securely communicate with the second computing device, when the first computing device and the second computing device are discovered to be in proximity of one another, without communications between the first computing device and the second computing device going through the access network, wherein proximity discovery is controlled by the access network by:
    receiving, at the first computing device from the access network, an advertisement that indicates that the first computing device and the second computing device are within proximity of one another; and
    sending, from the first computing device to the access network, a request to securely communicate with the second computing device without communications going through the access network.

20. An apparatus for providing secure communications in a communication system, comprising:
    a memory; and
    a processor coupled to the memory forming a first computing device, the processor and the memory of the first computing device configured to:
    receive at least one key from at least one network element of an access network sent to the first computing device and at least a second computing device, wherein the first computing device and the second computing device utilize the access network to access the communication system and are authenticated by the access network prior to the at least one key being sent; and
    utilize the at least one key to securely communicate with the second computing device, when the first computing device and the second computing device are discovered to be in proximity of one another, without communications between the first computing device and the second computing device going through the access network, wherein proximity discovery is controlled by the access network by:
    receiving, at the first computing device from the access network, an advertisement that indicates that the first computing device and the second computing device are within proximity of one another; and
    sending, from the first computing device to the access network, a request to securely communicate with the second computing device without communications going through the access network.

21. The apparatus of claim 20, wherein the network element is a base station, and the first computing device and the second computing device are mobile end-user devices.

22. The apparatus of claim 14, wherein the processor and the memory of the network element are further configured, after receiving the request, to verify that the first computing device and the second computing device are authenticated and authorized to securely communicate without their communications going through the access network.

* * * * *